H. MILES.
Wire-Stretcher.
No. 165,019.
Patented June 29, 1875.
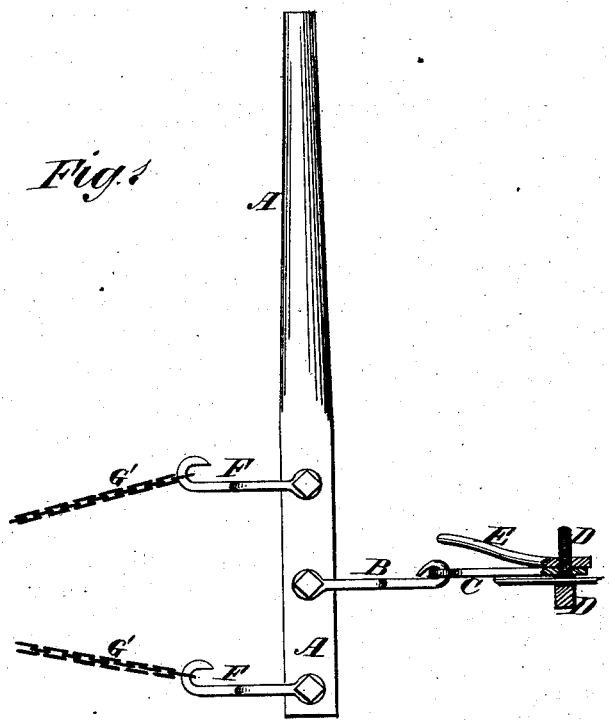
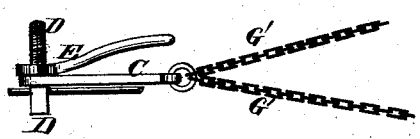
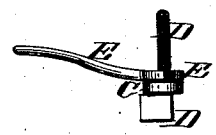
WITNESSES:
INVENTOR:
Henry Miles
BY
ATTORNEYS.

UNITED STATES PATENT OFFICE.

HENRY MILES, OF SPRINGDALE, IOWA.

IMPROVEMENT IN WIRE-STRETCHERS.

Specification forming part of Letters Patent No. 165,019, dated June 29, 1875; application filed April 10, 1875.

*To all whom it may concern:*

Be it known that I, HENRY MILES, of Springdale, in the county of Cedar and State of Iowa, have invented a new and useful Improvement in Wire-Tightener, of which the following is a specification:

Figure 1 is a side view of my improved wire-tightener, part of one of the clamps being broken away to show the construction. Fig. 2 is a detail view of one of the clamps. Fig. 3 is a detail view of the twisting-bar. Fig. 4 is a view of the tongs for holding the wires.

Similar letters of reference indicate corresponding parts.

My invention has for its object to furnish an improved device for drawing the wires of wire-fences and other wires taut to take up the slack, or to draw the ends of a broken wire together, to enable them to be fastened, and which shall be simple in construction and convenient in use.

The invention consists in the combination of the lever, the three hooks, the two chains, and the two clamps with each other, as hereinafter fully described.

A is a lever, to which, near one end, is pivoted the shank of a hook, B, the hook of which is passed through the eye of a short bar, C. In the outer end of the bar C is formed a hole to receive the bolt D, upon which is screwed a hand or lever nut, E. The bolt D is made with a one-sided or L head, in the under side of which head is formed a notch to receive the wire, and clamp it against the bar C. To the end part of the lever A, upon the opposite side of and equally distant from the hook B, are pivoted two hooks, F, to receive two chains, G, to the other or outer ends of which is attached a clamp, C D E, exactly like the one hereinbefore described.

In using the device, the chains G are hooked upon the hooks F, and the two clamps C D E are attached to the adjacent ends of the wire to be tightened. The lever A is then operated to slacken one of the chains G, which slack is taken up by hooking the chain upon its hook F. The lever A is then moved in the opposite direction to slacken the other chain G, the slack of which is taken up by hooking the said chain upon its hook F. In this way, by moving the lever A alternately in opposite directions, the wire may be drawn to any desired tension. When the wire has been drawn to the desired tightness, its ends are overlapped and grasped by the tongs H. One of the projecting ends of the wire is then passed through the hole in the bar I, and by means of said bar is twisted about the wire. The bar I is then slipped upon the other projecting end of the wire upon the other side of the tongs H, and that end is twisted around the wire, and the device is detached.

In this way the wire of a fence or any other wire can be drawn to any desired tension and its ends secured to each other firmly and quickly.

Having thus described my invention, I claim as new and desire to secure by Letters Patent—

The combination of the lever A, the three hooks B F F, the two chains G, and the two clamps C D E with each other, substantially as herein shown and described.

HENRY MILES.

Witnesses:
SAMUEL K. BYE,
PETER THOMAS.